Jan. 8, 1952  J. W. MIODUSKI ET AL  2,581,595
EDUCATIONAL APPARATUS
Filed Jan. 5, 1949  2 SHEETS—SHEET 2

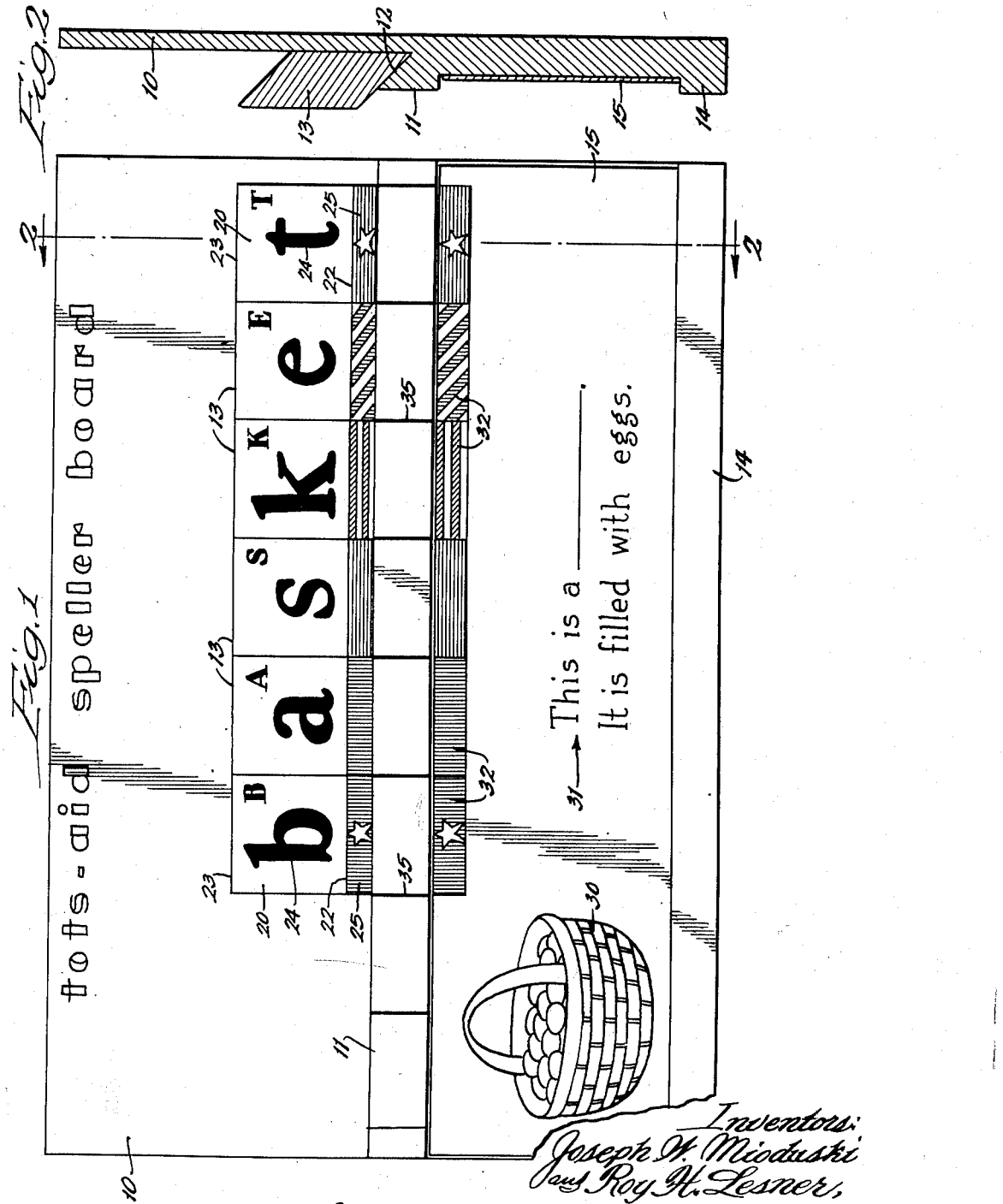

Inventors:
Joseph W. Mioduski
and Roy H. Lesner,
By Dawson, Orme, Booth and Spangenberg,
Attorneys.

Patented Jan. 8, 1952

2,581,595

UNITED STATES PATENT OFFICE 2,581,595

EDUCATIONAL APPARATUS

Joseph W. Mioduski and Roy H. Lesner,
Chicago, Ill.

Application January 5, 1949, Serial No. 69,327

4 Claims. (Cl. 35—73)

This invention relates to an educational apparatus useful as a spelling aid for children and is an improvement over the educational apparatus disclosed in Stranders Patent No. 1,428,456, patented September 5, 1922.

The principal object of this invention is to provide an improved educational apparatus which may be simply and readily manipulated by a child, which progressively educates as the child's intellect progresses or increases, and wherein substantially any word up to substantially eight letters may be spelled out by the apparatus.

In carrying out this object of the invention the educational apparatus preferably includes a board having a raised dividing partition, a plurality of blocks each having opposed edges adapted to engage one side of the dividing partition and opposed surfaces bearing exposed alphabetical letters and exposed distinctive color designs, and a plurality of elongated cards each adapted to engage the other side of the dividing partition and bearing reference to a subject and having a plurality of exposed aligned distinctive color designs. The arrangement is such that, when the color designs of the blocks are matched with the color designs of the cards, the alphabetical letters of the blocks will spell out the subjects of the cards.

The board forms a firm foundation for the cards and blocks during use and the raised dividing partition provides a solid guide against which the blocks and cards may be simply, readily and accurately placed by a small child. Thus, the educational apparatus may be simply and readily manipulated by small children. The color designs on the cards are arranged adjacent one side of the dividing partition and likewise the color designs of the blocks are arranged adjacent the other side of the dividing partition so that the color designs may be readily and easily matched to spell out the subjects of the cards.

Provision is also preferably made to provide proper location of the blocks with the color designs thereof adjacent the dividing partition. In this respect the dividing partition is undercut and the blocks are provided with slanting edges at the color designs adapted to engage in the undercut portion of the partition.

Preferably the blocks are thicker than the dividing partition and parallelogram shaped in cross section. Opposed surfaces of the blocks are provided with alphabetical letters and the obtuse edges of the blocks adjacent the alphabetical letters are provided with the corresponding distinctive color designs. Thus, while the surfaces of the blocks carry only the alphabetical letters, the associated distinctive color design is also exposed to view. Accordingly, the alphabetical letters and the color designs are associated to assist in the operation of the apparatus, but yet, being located on different surfaces are somewhat disassociated. This permits a beginner readily to learn to spell by using the color designs and at the same time permits a more advanced child to spell without particular reference to the color designs. The educational apparatus of this invention is therefore progressive in nature in that it continues to educate the child as the child's intellect progresses or increases. If desired, the aligned color designs on the card may be removably covered with a strip of suitable material so that an advanced child may spell out with the blocks the words of the cards with no reference whatsoever to the color designs. The strip may then be removed and the spelling checked by comparing the color designs of the cards and blocks.

The educational apparatus preferably includes substantially twenty blocks providing substantially forty surfaces bearing alphabetical letters and corresponding distinctive color designs. Provision is therefore made for all twenty-six letters of the alphabet with many of the more used letters duplicated. The cards are adapted to carry up to substantially eight aligned color designs so that substantially any word up to substantially eight letters may be spelled out by the educational apparatus of this invention. The color designs preferably consist of four basically different colors and substantially six basically different designs of each so that each letter of the alphabet has associated therewith a basically different and readily discernable color design.

Further objects of this invention reside in the details of construction of the educational apparatus and the cooperative relationship between the component parts thereof.

Other objects and advantages will become apparent to those skilled in the art upon reference to the accompanying specification, claims and drawings in which:

Figure 1 is a top plan view of the educational apparatus of this invention illustrating the same in use;

Figure 2 is a sectional view through the educational apparatus taken substantially along the line 2—2 of Fig. 1;

Figure 3:
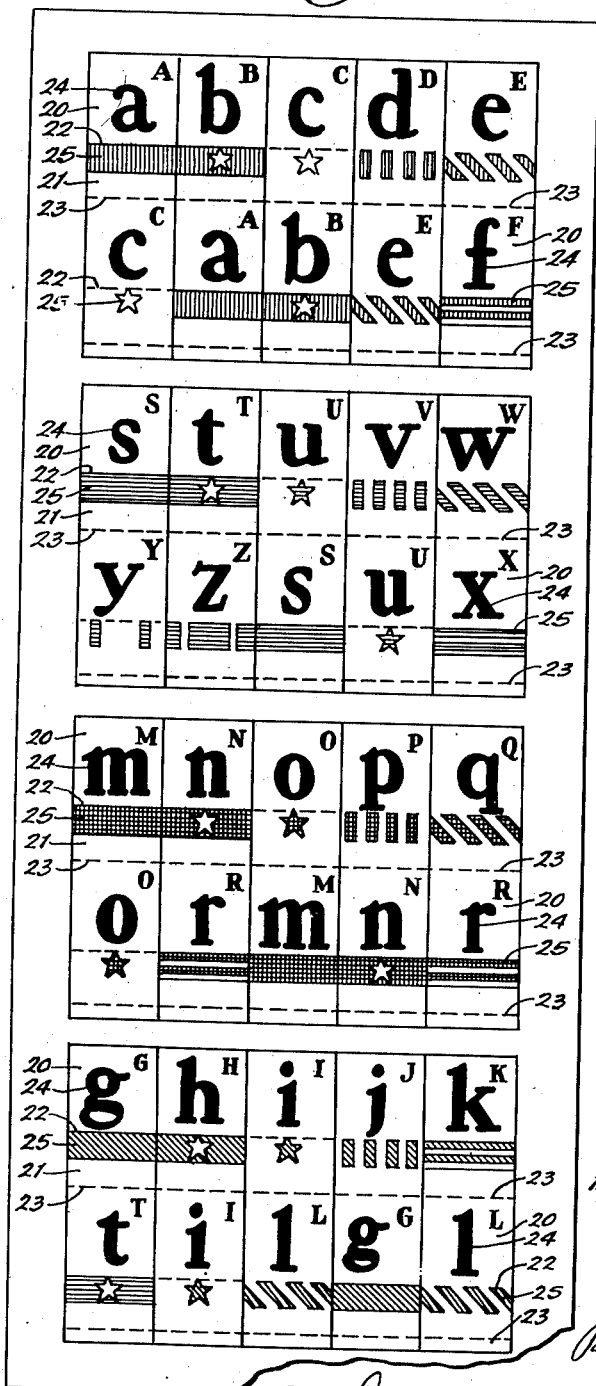
Figure 3 is a layout of the alphabetical letters and associated color designs utilized on the various blocks.

Referring first to Figs. 1 and 2 the educational apparatus of this invention includes a board 10 which may be made of any suitable material such as wood, plastic or the like. The board 10 is intermediately provided with a raised dividing partition 11 and preferably one side of this partition is undercut as indicated at 12. A plurality of blocks 13 preferably parallelogram shaped in cross section are adapted to be supported by the board 10 and to engage in the undercut edge 12 of the dividing partition. The board 10 may also be provided with a raised portion 14. One of a plurality of cards 15 may be supported by the board 10 between the raised portion 14 and the raised dividing partition 11, the partition 11 serving as a guide for the cards.

Figure 4:
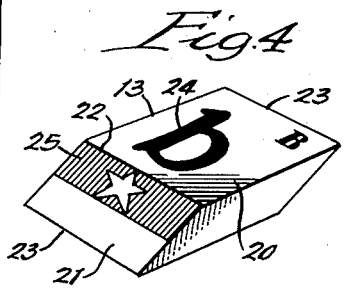
Figures 4 and 5 are perspective views of opposite sides of a block utilized in this invention.
Figure 5:
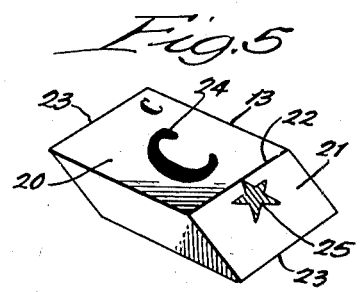

The blocks 13 are preferably parallelogram shaped in cross section and include a pair of opposed surfaces 20 and a pair of opposed slanting edges 21 as is more clearly illustrated in Figs. 4 and 5. The surfaces 20 and slanting edges 21 join each other at 22 in an obtuse angle and join each other at 23 in an acute angle. The surfaces 20 are provided with alphabetical letters 24 and the slanting edges 21 adjacent 22 are provided with color designs 25. Preferably the blocks 13 are thicker than the dividing partition 11 so that when they are abutted against the dividing partition the color designs 25 are exposed to view. Because of the parallelogram shape of the blocks opposed surfaces thereof may be provided with alphabetical letters and color designs and both sides of the blocks may be utilized in conjunction with the board 10 for spelling out words. The blocks may be formed of any suitable material such as wood, plastic, or the like, and the alphabetical letters and color designs may be carried on the same in any suitable manner. They may be printed or applied directly to the blocks or they may be printed or applied to suitable coverings such as paper which in turn may be suitably secured to the blocks.

Fig. 3 illustrates the preferred layout of the various letters and corresponding color designs applied to the various blocks. As illustrated there are 20 blocks each bearing two letters and corresponding color designs. Preferably, the colors in the upper group are red, in the next group blue, in the next group black and in the bottom group green. Each color group has six similar designs such as a solid color block, a solid color block provided with a white star, a colored star, colored bars, colored diagonals, and colored stripes. The letter "t," having a blue block with a white star, is included in the green group, this being necessitated by the particular grouping here utilized. There being four colors and six specific designs for each color, 24 letters are, therefore, provided thereby. In order to take care of the two additional letters of the alphabet they may be provided with still different colored designs. For example, in the blue group the letter "y" is provided with two blue bars on a white background and the letter "z" is provided with two white bars on a blue background. In this way all 26 letters of the alphabet have associated therewith distinctive color designs. In accordance with the preferred layout of Fig. 3, the letters which are mostly used such as the letters; a, b, c, e, g, i, l, m, n, o, r, s, t, and u are duplicated on different blocks, while the lesser used letters; d, f, h, j, k, p, q, v, w, x, y and z appear only once. In a breakdown of the English language, it has been found that certain of the letters occur with most regular frequency and in the order of their frequencies, these letters are ETONAIRS. The educational apparatus of this invention uses these principles. In this way, by utilizing only 20 blocks all of the letters of the alphabet are provided and the mostly used letters are duplicated.

The layout of Fig. 3 illustrates the letters and color designs imprinted or otherwise applied to a paper covering which may be cut in strips and suitably applied to the blocks 13. The general scheme of Fig. 3 may be utilized for directly imprinting or applying the letters to the blocks.

The cards 15 may be made of any suitable material such as paper, plastic or the like. They may bear a picture 30 of a subject and they also may bear a written reference 31 thereto. The cards along their upper edges are provided with aligned color designs 32 corresponding to the color designs of the blocks. For example, the color designs 32 illustrated in Fig. 1 corresponds to the letters spelling out the word "basket" and the illustration 30 and the descriptive material 31 have to do with a basket.

When the card 15 is placed upon the board 10 and the blocks selected in accordance with the color designs of the card, the blocks when applied to the board 10 will spell out the word "basket." To assist in arranging the blocks with respect to the color designs on the card the dividing partition is preferably provided with aligning indicia 35.

By using different cards with different designations and color designs different words may be spelled out with the blocks. The cards are of sufficient length that they may carry substantially 8 aligned color designs so that when taken in conjunction with the 20 blocks may operate to spell out substantially any word up to substantially eight letters.

Figure 6:
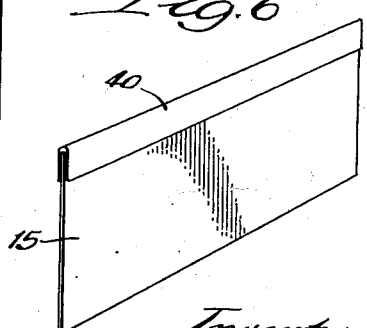
Figure 6 is a perspective view of a card with a removable strip applied over the aligned color designs thereof.

While the surfaces of the blocks carry only the alphabetical letters the associated distinctive color designs thereof are carried by the obtuse edges and are also exposed to view. Accordingly, the alphabetical letters and the color designs of the blocks are associated to assist in the operation of the apparatus, but yet, being located on different surfaces are somewhat disassociated. This permits a beginner readily to learn to spell by using the color designs and at the same time permits a more advanced child to spell without particular reference to the color designs. In this respect, therefore, the educational apparatus of this invention is progressive in nature. For use by a still more advanced child the aligned distinctive color designs 32 of the cards 15 may be covered and concealed by a strip of suitable material such as paper, plastic or the like as indicated at 40 in Fig. 6. The strips 40 are preferably folded as indicated and are removably secured to the cards 15 slipping them over the edges of the cards as indicated in Fig. 6. Instead of removably securing the strip 40 to a card, the strip may be movably secured to the board 10 or partition 11 for overlying and concealing the color designs on the cards when placed on the board. The strips 40 may also be loose from the board or cards and merely positioned over the color designs to conceal the same. The strips may be opaque or translucent for all that is necessary is that they conceal the specific color designs thereunder. The card 15 with the strip 40 removably secured thereto may be placed in the apparatus by an advanced child who can then select the appropriate blocks by reference to the subjects printed on the card without reference to the particular color designs thereon. After the child has spelled with the blocks the subject indicated by the card, all that is necessary is to remove the strip 40 and the spelling may be checked by a mere comparison of the color designs on the card and blocks.

While for purposes of illustration, one form of this invention has been disclosed, other forms thereof may become apparent to those skilled in the art upon reference to this disclosure and therefore this invention is to be limited only by the scope of the appended claims.

We claim as our invention:

1. In an educational apparatus, a board having a raised dividing partition, a plurality of blocks each having opposed edges adapted to engage one side of the dividing partition and provided with opposed surfaces each having an exposed alphabetical letter and an exposed distinctive color design adapted to lie adjacent the partition, and a plurality of elongated cards each adapted interchangeably to engage the other side of the dividing partition and bearing reference to a subject and having a plurality of exposed distinctive color designs each equal to the width of the blocks and marginally aligned along the partition engaging edge of the card, the arrangement being such that, when the color designs of the blocks are matched with the color designs of a card, the alphabetical letters of the blocks will spell out the subject of that card.

2. In an educational apparatus, a board having a raised dividing partition and provided with an undercut edge, a plurality of blocks thicker than the partition and each having a slanting edge adapted to engage with the undercut edge of the partition, an exposed distinctive color design on the upper portion of the slanting edge and an exposed alphabetical letter on the face of the block adjacent the color design, and a plurality of elongated cards each adapted interchangeably to engage the other side of the dividing partition and bearing reference to a subject and having a plurality of exposed distinctive color designs each equal to the width of the blocks and marginally aligned along the partition engaging edge of the card, the arrangement being such that, when the color designs of the blocks are matched with the color designs of a card, the alphabetical letters of the blocks will spell out the subject of that card.

3. In an educational apparatus, a board having a raised dividing partition and provided with an undercut edge, a plurality of blocks thicker than the partition and parallelogram shaped in cross section to provide opposed face surfaces and slanting edges with the opposed oblique corners adapted to engage in the undercut edge of the partition and each having exposed alphabetical letters on the opposed face surfaces and exposed distinctive color designs on the opposed slanting edges adjacent the obtuse corners, and a plurality of elongated cards each adapted interchangeably to engage the other side of the dividing partition and bearing reference to a subject and having a plurality of exposed distinctive color designs each equal to the width of the blocks and marginally aligned along the partition engaging edge of the card, the arrangement being such that, when the color designs of the blocks are matched with the color designs of a card, the alphabetical letters of the blocks will spell out the subject of that card.

4. An educational block parallelogram shaped in cross section to provide opposed face surfaces and slanting edges and having alphabetical letters on the opposed face surfaces of the block and distinctive color designs on the opposed slanting edges adjacent the obtuse corners of the block.

JOSEPH W. MIODUSKI.
ROY H. LESNER.

REFERENCES CITED

The following references are of record in the file of this patent:

UNITED STATES PATENTS

| Number | Name | Date |
|---|---|---|
| 156,959 | Taylor | Nov. 17, 1874 |
| 163,912 | Birmeli | June 1, 1875 |
| 345,553 | Starr | July 13, 1886 |
| 364,845 | Oakley | June 14, 1887 |
| 1,354,910 | Ketchum | Oct. 5, 1920 |
| 1,428,456 | Stranders | Sept. 5, 1922 |
| 1,479,423 | Barton | Jan. 1, 1924 |

FOREIGN PATENTS

| Number | Country | Date |
|---|---|---|
| 323,054 | France | July 18, 1902 |